UNITED STATES PATENT OFFICE.

HUBERT KOLF, OF BONN, GERMANY.

PROCESS OF MAKING SMOKELESS POWDER.

SPECIFICATION forming part of Letters Patent No. 583,489, dated June 1, 1897.

Application filed March 27, 1893. Serial No. 467,823. (No specimens.) Patented in Germany May 4, 1890, No. 56,786, and September 29, 1891, No. 62,159, and in England December 10, 1892, No. 22,739.

*To all whom it may concern:*

Be it known that I, HUBERT KOLF, of Bonn, Germany, have invented certain new and useful Improvements in the Manufacture of Smokeless Explosives, of which the following is a full, clear, and exact description of the invention, and for which invention I have obtained a patent in Germany, dated September 29, 1891, No. 62,159, as a patent of addition to my original patent, dated May 4, 1890, No. 56,786, and in England, No. 22,739, dated December 10, 1892.

My invention relates to the manufacture of substantially smokeless explosives, and it has for its object the production of an explosive particularly adapted for purposes of blasting.

In carrying out my invention any suitable carbohydrate or combination of carbohydrates may be used—as, for instance, malt grain, ground or comminuted malt, refuse from the mash of distilleries and breweries, wood-moss, carob, marsh-mallow, the branches and refuse thereof, refuse resulting from the manufacture of starch, Iceland moss, and other similar carbohydrates. These or one of these are or is treated with a mixture of nitric and sulfuric acids in the proportion of about one part nitric acid and two parts sulfuric acid at a temperature of from 20° to 30° centigrade, in a suitable vessel for about twelve hours in order to obtain a highly-nitrated product, the proportion of carbohydrate material being such that the nitrated product will contain about 12.8 parts, or about thirteen per cent., of nitrogen. The nitrated mass is washed in cold water, the latter removed as much as possible either by filtration or centrifugal action, after which the material is dried at a temperature of from 40° to 50° centigrade, and ground or pulverized, which latter operation may, however, be performed while the material is still moist or damp. The nitrated and pulverized material is now treated with an aqueous solution of an alkaline sulfid—as, for instance, potassium sulfid, preferably of a strength of about ten per cent., whereby the rate of combustion is regulated. As an example, I may state that good results are obtained by treating one kilo of the nitrated, pulverized, and dried material with about one hundred grams of potassium sulfid, ($K_2S$,) under addition of about one thousand grams of water, but these proportions will vary according to the uses made of the explosive. This operation is effected in an iron vessel adapted to be closed fluid-tight and provided with means for introducing air into the same, such air being compressed to about five atmospheres. After the material has remained under pressure for about two hours the air is allowed to escape and the material is then washed in water and thoroughly dried. In this operation a conversion of the nitrocarbohydrate or nitrocellulose into carbohydrate or ordinary cellulose cannot take place under the action of the potassium sulfid for the reason that said action is not prolonged enough when operating at a normal temperature, nor is the solution sufficiently concentrated to result in such conversion. On the contrary, the nitrated product takes up under a chemical reaction a certain quantity of sulfur. At all events there is no mechanical mixture, which is evidenced by the fact that the sulfur cannot be removed by solvents, which would be the case if the mixture were simply a mechanical one. This is corroborated by analytical results of the product, as shown by the following two examples, to wit:

| Nitrogen. | Carbon. | Hydrogen. | Sulfur. |
|---|---|---|---|
| 12.23 | 26.49 | 3.18 | 2.48 |
| 13.53 | 26.80 | 3.07 | 2.56 | the percentage of nitrogen present clearly showing that a reduction of the nitrocarbohydrate into a carbohydrate does not take place. Now this addition or chemical combination of sulfur with the nitrocellulose regulates the combustion and also prevents the formation of those nitro products formed during the combustion of nitrocellulose free from sulfur.

It would not be possible to express the product by a chemical formula for the reason that a specific nitrocarbohydrate is not present in the product, but mixtures of such nitrocarbohydrates ranging from bi to hexa nitro combinations.

The dried material is now combined or mixed with from five to twenty per cent. of potassium nitrate in solution, or sodium or ammonium nitrate at ordinary temperatures, and preferably under a pressure of from four to five atmospheres. The mixture is allowed to stand about twelve hours, when the liquid is removed as much as possible by filtration or centrifugal action, and the mass is then dried at a temperature of about 80° centigrade.

The product obtained as above described, I use as an absorbent of a nitro compound—as, for instance, nitro-sugar, nitro-molasses, or nitroglycerin—the said product being capable of absorbing from about twenty per cent. to about seventy per cent. of the nitro compounds. On the other hand, the nitrated carbohydrate, after treating the same with an alkaline sulfid, may be converted into a gelatinous body by solution in any one or more of the following solvents, to wit: Camphor-oil, ethyl acetate, aceton, methylalcohol, ethylalcohol, nitrobenzole, and ether, in combination with nitro-molasses, nitro-sugar, or nitroglycerin, the proportion of which latter may be even greater than seventy per cent.

The nitro products last referred to may be mixed with the solvent or with the carbohydrate containing sulfur before the solvent is added thereto, or with the solution of said carbohydrate combined with sulfur. After complete solution and conversion of the compound into a gelatinous mass, the solvent is eliminated either by evaporation or distillation, preferably *in vacuo*, whereby a plastic product is obtained which may then be cut into suitable form or use, as into strips, sheets, ribbons, cubes, or the like.

In order to increase the chemical stability of the blasting product, I preferably add to the solution from one to two per cent. of anilin, and in order to still further reduce the danger in handling I add about two per cent. of a suitable hydrocarbon, as paraffin.

In various experiments made in the process of obtaining the nitrated carbohydrate combined with sulfur I have discovered a simpler method than that above described, in that the nitration of the carbohydrate including cellulose need not be effected under pressure. On the other hand, when it is not desired to regulate the combustion of the explosive, which for blasting purposes is not absolutely necessary, the combination of sulfur with the nitrated carbohydrate may be dispensed with. Furthermore, after nitrating the carbohydrate it can be treated with a solution of an alkaline sulfid, as potassium or sodium sulfid, and thereafter with a solution of an alkaline nitrate, and both operations may be carried out in a closed vessel under pressure or otherwise, as may be desired, or the nitrated carbohydrate may be treated with an alkaline nitrate and then the treatment thereof with an alkaline sulfid dispensed with. The carbohydrate treated as described is then washed in water with sufficient rapidity as not to remove the alkaline nitrates, after which the compound is dried at a temperature of about 70° to 80° centigrade. With this product I combine a nitro product that has not been treated with an alkaline nitrate and that is free from sulfur and readily absorbed thereby, as nitrosugar, nitro-molasses, or nitroglycerin, the compound being heated to about 60° centigrade, whereby a gelatinous or semigelatinous mass is obtained, which by kneading or pressure can be converted into a thoroughly plastic mass adapted to be reduced to the proper form for use as a blasting agent. The product thus obtained is waterproof, and hence can be burned or exploded under water without a protective covering.

Having thus described my invention, what I claim as new therein, and desire to secure by Letters Patent, is—

1. The improvement in the manufacture of explosives which consists in nitrating a carbohydrate, treating the same successively with solutions of an alkaline sulfid and an alkaline nitrate, and mixing therewith a nitro product not charged with an alkaline nitrate and sulfur, as described.

2. The improvement in the manufacture of explosives which consists in nitrating a carbohydrate, treating the same with an alkaline sulfid, then saturating with an alkaline nitrate, mixing therewith a nitro product as nitro-molasses (or nitro-sugar or nitroglycerin,) and converting the compound into a gelatinous body by means of a suitable solvent.

3. The improvement in the manufacture of explosives which consists in nitrating a carbohydrate, treating the same with an alkaline sulfid, then saturating it with an alkaline nitrate, drying, mixing therewith a nitro product such as described, heating the mixture to from 40° to 80° centigrade, converting the same into a plastic body and reducing the same to form for use, substantially as described.

In testimony whereof I have hereto affixed my signature in presence of two witnesses.

HUBERT KOLF.

Witnesses:
FRITZ SCHROEDER,
EVA HAUSEN.